US008612637B2

(12) United States Patent
Chandhoke

(10) Patent No.: US 8,612,637 B2
(45) Date of Patent: Dec. 17, 2013

(54) CONFIGURING BUFFERS WITH TIMING INFORMATION

(75) Inventor: Sundeep Chandhoke, Austin, TX (US)

(73) Assignee: National Instruments Corporation, Austin, TX (US)

( * ) Notice: Subject to any disclaimer, the term of this patent is extended or adjusted under 35 U.S.C. 154(b) by 113 days.

(21) Appl. No.: 13/244,572

(22) Filed: Sep. 25, 2011

(65) Prior Publication Data

US 2013/0080661 A1 Mar. 28, 2013

(51) Int. Cl.
*G06F 3/00* (2006.01)

(52) U.S. Cl.
USPC .............................................. 710/8; 717/106

(58) Field of Classification Search
None
See application file for complete search history.

(56) References Cited

U.S. PATENT DOCUMENTS

| | | | |
|---|---|---|---|
| 4,796,179 A | 1/1989 | Lehman et al. |
| 4,831,580 A | 5/1989 | Yamada |
| 4,901,221 A | 2/1990 | Kodosky et al. |
| 4,914,568 A | 4/1990 | Kodosky et al. |
| 5,089,973 A | 2/1992 | Furtek |
| 5,119,373 A | 6/1992 | Fredricsson et al. |
| 5,210,837 A | 5/1993 | Wiecek |
| 5,237,691 A | 8/1993 | Robinson et al. |
| 5,301,301 A | 4/1994 | Kodosky et al. |
| 5,475,851 A | 12/1995 | Kodosky et al. |
| 5,481,712 A | 1/1996 | Silver et al. |
| 5,481,741 A | 1/1996 | McKaskle et al. |
| 5,576,946 A | 11/1996 | Bender et al. |
| 5,612,866 A | 3/1997 | Savanyo et al. |
| 5,732,277 A | 3/1998 | Kodosky et al. |
| 5,742,504 A | 4/1998 | Meyer et al. |
| 5,862,372 A | 1/1999 | Morris et al. |
| 5,892,762 A | 4/1999 | Okuda et al. |
| 5,911,070 A | 6/1999 | Solton et al. |
| 5,938,739 A | 8/1999 | Collins et al. |
| 5,940,296 A | 8/1999 | Meyer |
| 5,966,532 A | 10/1999 | McDonald et al. |
| 6,053,951 A | 4/2000 | McDonald et al. |

(Continued)

FOREIGN PATENT DOCUMENTS

EP 1077404 2/2001

OTHER PUBLICATIONS

"Special Report: Imaging and the Macintosh/Robust Image Databases" Advanced Imaging, Apr. 1991, pp. 18-32.

(Continued)

*Primary Examiner* — Elias Mamo
(74) *Attorney, Agent, or Firm* — Meyertons Hood Kivlin Kowert & Goetzel, P.C.; Jeffrey C. Hood; Joel L. Stevens

(57) ABSTRACT

Configuring a buffer with timing information. Initially, a buffer for transferring data from a first device to a second device may be configured, e.g., in response to user input. For example, configuring the buffer may include specifying a size of the buffer, specifying timing for delivery of data of the buffer, and/or specifying transfer of the data from a first device to a second device. In response to the configuration of the buffer, code may be automatically generated which implements the transfer of the data from the first device to the second device according to the specified timing for delivery of the data of the buffer. Accordingly, the automatically generated code may be executable to transfer the data according to the specified timing from the first device to the second device.

20 Claims, 9 Drawing Sheets

(56) References Cited

U.S. PATENT DOCUMENTS

| | | | |
|---|---|---|---|
| 6,219,628 | B1 | 4/2001 | Kodosky et al. |
| 6,243,783 | B1 * | 6/2001 | Smyers et al. ............... 710/310 |
| 6,366,300 | B1 | 4/2002 | Ohara et al. |
| 6,385,765 | B1 | 5/2002 | Cleaveland et al. |
| 6,437,805 | B1 | 8/2002 | Sojoodi et al. |
| 6,453,464 | B1 | 9/2002 | Sullivan |
| 6,865,429 | B1 | 3/2005 | Schneider et al. |
| 6,880,130 | B2 | 4/2005 | Makowski et al. |
| 6,931,288 | B1 | 8/2005 | Lee et al. |
| 6,954,904 | B2 | 10/2005 | White |
| 7,000,190 | B2 | 2/2006 | Kudukoli et al. |
| 7,024,631 | B1 | 4/2006 | Hudson et al. |
| 7,043,693 | B2 | 5/2006 | Wenzel et al. |
| 7,062,718 | B2 | 6/2006 | Kodosky et al. |
| 7,062,719 | B2 | 6/2006 | Zirojevic et al. |
| 7,076,740 | B2 | 7/2006 | Santori et al. |
| 7,120,876 | B2 | 10/2006 | Washington et al. |
| 7,159,183 | B1 | 1/2007 | Kudukoli et al. |
| 7,200,838 | B2 | 4/2007 | Kodosky et al. |
| 7,210,117 | B2 | 4/2007 | Kudukoli et al. |
| 7,219,306 | B2 | 5/2007 | Kodosky et al. |
| 7,302,675 | B2 | 11/2007 | Rogers et al. |
| 7,356,774 | B2 | 4/2008 | Shah et al. |
| 7,367,028 | B2 | 4/2008 | Kodosky et al. |
| 7,478,337 | B2 | 1/2009 | Kodosky et al. |
| 7,551,647 | B2 | 6/2009 | Fellman et al. |
| 7,581,043 | B2 | 8/2009 | Dixon |
| 7,606,950 | B2 | 10/2009 | Breyer |
| 7,627,860 | B2 | 12/2009 | Kodosky et al. |
| 7,650,574 | B2 | 1/2010 | Nattinger |
| 7,650,594 | B2 | 1/2010 | Nattinger |
| 7,703,034 | B2 | 4/2010 | Kornerup et al. |
| 7,761,846 | B2 | 7/2010 | Hayles |
| 7,761,847 | B2 | 7/2010 | Kornerup et al. |
| 7,802,229 | B2 | 9/2010 | Kornerup et al. |
| 7,844,908 | B2 | 11/2010 | Kodosky et al. |
| 7,882,445 | B2 | 2/2011 | Neumann |
| 7,996,782 | B2 | 8/2011 | Hayles et al. |
| 2002/0022895 | A1 | 2/2002 | Genise et al. |
| 2002/0129333 | A1 | 9/2002 | Chandhoke et al. |
| 2003/0071842 | A1 | 4/2003 | King et al. |
| 2003/0071845 | A1 | 4/2003 | King et al. |
| 2004/0031019 | A1 | 2/2004 | Lamanna et al. |
| 2004/0032429 | A1 | 2/2004 | Shah et al. |
| 2004/0034696 | A1 | 2/2004 | Joffrain et al. |
| 2004/0034847 | A1 | 2/2004 | Joffrain et al. |
| 2004/0158812 | A1 | 8/2004 | Dye et al. |
| 2004/0210592 | A1 | 10/2004 | Ciolfi et al. |
| 2004/0230946 | A1 | 11/2004 | Makowski et al. |
| 2005/0028138 | A1 | 2/2005 | Case et al. |
| 2005/0091602 | A1 | 4/2005 | Ramamoorthy et al. |
| 2005/0177816 | A1 | 8/2005 | Kudukoli et al. |
| 2005/0235290 | A1 * | 10/2005 | Jefferson et al. ............... 719/310 |
| 2005/0251789 | A1 | 11/2005 | Peck et al. |
| 2005/0257194 | A1 | 11/2005 | Morrow et al. |
| 2005/0257195 | A1 | 11/2005 | Morrow et al. |
| 2005/0286422 | A1 * | 12/2005 | Funato .......................... 370/235 |
| 2006/0026560 | A1 | 2/2006 | Kornerup et al. |
| 2006/0053409 | A1 | 3/2006 | Kornerup et al. |
| 2006/0225034 | A1 * | 10/2006 | Peck et al. ..................... 717/106 |
| 2006/0253835 | A1 | 11/2006 | Saelens |
| 2007/0044030 | A1 | 2/2007 | Hayles |
| 2007/0044071 | A1 | 2/2007 | Hayles |
| 2007/0088865 | A1 | 4/2007 | Breyer |
| 2007/0089063 | A1 | 4/2007 | Breyer |
| 2008/0034079 | A1 * | 2/2008 | Kodosky et al. ............... 709/223 |
| 2008/0034297 | A1 | 2/2008 | Correll et al. |
| 2008/0034298 | A1 | 2/2008 | Kodosky et al. |
| 2008/0034299 | A1 | 2/2008 | Hayles et al. |
| 2008/0126956 | A1 | 5/2008 | Kodosky et al. |
| 2008/0209392 | A1 | 8/2008 | Able et al. |
| 2008/0263456 | A1 | 10/2008 | Stults et al. |
| 2008/0263463 | A1 | 10/2008 | Neumann |
| 2008/0307332 | A1 | 12/2008 | Hayles et al. |
| 2009/0241068 | A1 | 9/2009 | Page et al. |
| 2009/0241069 | A1 | 9/2009 | Fuller, III et al. |
| 2010/0064083 | A1 | 3/2010 | Ng et al. |
| 2011/0145703 | A1 * | 6/2011 | Nematollahi Mahani .... 715/274 |

OTHER PUBLICATIONS

"Ultimage and IPLab Spectrum: Two image processors reveal hidden scientific data in photographs", MacUser, Jul. 1991, 5 pages.

Vasilache, et al., "Translating OMT State Diagrams with Concurrency into SDL Diagrams", University of Tsukuba, Japan, Aug. 28-31, 2000, 6 pages.

Villiger, et al., "Self-timed Ring for Globally-Asynchronous Locally-Synchronous Systems", Proceedings of the 9th International Symposium on Asynchronous Circuits and Systems, 2003, IEEE, pp. 1-10.

Altium Limited, "Altium Nexar release heads 'LiveDesign-enabled' 2004 product line-up", Press Release, Feb. 17, 2004, 3 pages.

Andrade, et al., "Software Synthesis from Dataflow Models for G and LabVIEW", IEEE Asilomar Conference on Signals, Systems, and Computers, Pacific Grove, California, Nov. 1998, pp. 1705-1709.

Automatix, Inc., "A Seminar on Machine Vision & Image Analysis", 1993, 46 pages.

Automatix, "Vision for Process Feedback and Control", News Release, <www.applefritter.com/macclones/automatix/newsrelease>, Jul. 3, 2000, 4 pages. [Retrieved Feb. 15, 2002].

Axys Design Automation, Inc., "Product Description for MaxCore", 2002, 2 pages.

Axys Design Automation, Inc., "Product Description for MaxSim", 2002, 2 pages.

Besnard, et al, "Design of a multi-formalism application and distribution in a data-flow context: an example", 12th International Symposium on Languages for International Programming, Athens, Greece, Jun. 1999, pp. 8-30.

Bhattacharyya, et al., "Synthesis of Embedded Software from Synchronous Dataflow Specifications", Journal of VLSI Signal Processing, vol. 21, 1999, pp. 151-166.

Buck, et al., "Ptolemy: A Framework for Simulating and Prototyping Heterogeneous Systems", International Journal in Computer Simulation, vol. 4, No. 2, 1994, pp. 155-182.

Chandrachoodan, et al., "An Efficient Timing Model for Hardware Implementation of Multirate Dataflow Graphs", IEEE, 2001, pp. 1153-1156.

Chang, et al., "Heterogeneous Simulation—Mixing Discrete-Event Models with Dataflow", Journal of VLSI Signal Processing, vol. 15, The Netherlands, 1997, pp. 127-144.

Compumotor, "Motion Architect User Guide", Aug. 1994, 24 pages.

Lee, Edward A., Stephen Neuendorffer, "Concurrent models of computation for embedded software", IEE Proceedings—Comput. Digit. Tech., vol. 152, No. 2, Mar. 2005, pp. 239-250.

Edwards, "The Specification and Execution of Heterogeneous Synchronous Reactive Systems", Doctoral Dissertation, University of California, Berkeley, 1997, 170 pages.

Lee, Edward A., "Embedded Software", Advances in Computers, vol. 56, Academic Press, London, 2002, 34 pages.

Ric Ford, "Optimage Processes Scientific Images", 1994, 1 page.

GE Fanuc, "GE Fanuc Automation—Cimplicity Machine Edition", 2000, 4 pages.

GE Fanuc, "GE Fanuc Automation—Software Solutions", 2002, 8 pages.

GE Industrial Systems, "Cimplicity Machine Edition—Motion Developer", Dec. 6, 2001, 4 pages.

Gitlow, "X-Ray Vision", MacGuide Magazine, vol. 2, Issue 4, Jun. 1989, pp. 89-94.

"Graphical User Interface (GUI)", The Motive Web Design Glossary, www.motive.co.nz/glossary/gui.php, retrieved May 14, 2007, 2 pages.

"GUI Definition" <www.whatis.com>, <http://searchvb.techtarget.com/sDefinition/0,290660,sid8.sub.--gci213-989,00.html>, retrieved May 14, 2007, 1 page.

Hunt, "IDF: A graphical dataflow programming language for image processing and computer vision", IEEE, 1990, pp. 351-360.

(56) References Cited

OTHER PUBLICATIONS

Lee, Edward A., et al., "Actor-Oriented Design of Embedded Hardware and Software Systems", Journal of Circuits, Systems, and Computers, vol. 12, No. 3, World Scientific Publishing Company, 2003, pp. 231-260.
Keddy, et al. "DEDIP: A user-friendly environment for digital image processing algorithm development", IEEE Pacific Rim Conference on Communications, Computers and Signal Processing, May 9-10, 1991, pp. 733-736.
Konstantinides, et al., "The Khoros Software Development Environment for Image and Signal Processing", 1992, retrieved from <http://www.hpl.hp.com/techreports/92/HPL-92-96.pdf> on Jan. 7, 2003, pp. 1-14.
Lee, Edward A. et al, "Ptolemy II, Heterogeneous Concurrent Modeling and Design in Java", Jul. 29, 2004, <http://ptolemy.eecs.berkeley.edu/papers/04/ptIIDesignIntro/ptIIdesign-1-intro.pdf>, pp. 1-141.
Lee, Edward A. et al, "Ptolemy II, Heterogeneous Concurrent Modeling and Design in Java", Jul. 29, 2004, <http://ptolemy.eecs.berkeley.edu/papers/04/ptIIDesignIntro/ptIIdesign-1-intro.pdf>, pp. 142-282.
Magnusson, "State diagram generation", Term paper in the graduate course Attribute Grammars, Lund University, Spring 1999, 21 pages.
The Mathworks, "Simulink Model-Based and System-Based Design", Version 5, Jul. 2002, 598 pages. [Parts 1-4].
The Mathworks, "Stateflow for State Diagram Modeling User's Guide", Version 4, 1997, 6 pages.
Mort, et al., "Low cost image analysis workstation which is menu driven and extensible", SPIE, vol. 1232, Medical Imaging IV: Image Capture and Display, 1990, pp. 380-389.
"Motion Builder: making motion control programming easy", Servo Catalogue—Motion Builder 6000 Software, Parker Automation, pp. 86-87.
National Instruments, "IMAQ Vision Builder Tutorial", Jan. 1999, 73 pages.
National Instruments, "Measurement and Automation Catalogue 1999", pp. 518-520.
National Instruments, "The Measurement and Automation Catalog 2002", 19 pages.
National Instruments, "The Measurement and Automation Catalog 2004", 3 pages.
"Optilab: Image Processing and Analysis Software for the Apple Macintosh II Users Manual", GTFS Inc., 1990, 238 pages.
Pino, et al., "Cosimulating Synchronous DSP Designs with Analog RF Circuits," Hewlett Packard, 1999, 15 pages.
Rizzo, "Image Analyst and Enhance", MacUser, Jul. 1990, pp. 55-58.
"RoboWorks", Newtonium, retrieved from Internet on Mar. 30, 2002, <www.newtonium.com/public.sub.--html/Products/RoboWorks/RoboWorks.htm&-gt;, 3 pages.
Rosenthal, et al., "Integrated approach to machine vision application development", SPIE, vol. 1386 Machine Vision Systems Integration in Industry, 1990, pp. 158-162.
Signal Analytics Corporation, "Signal Analytics Brings Powerful Scientific Image Processing to the Macintosh II", News Release, Feb. 1, 1990, 2 pages.
Signal Analytics Corporation, "IPLab Brings Affordable Scientific Image Processing to the Macintosh II", estimated 1990, 2 pages.
Signal Analytics Corporation, "IPLab Gives You Unparalleled Value", 1992, 8 pages.
Signal Analytics Corporation, "IPLab: Serious Scientific Image Processing for the Macintosh II", 1992, 4 pages.
Signal Analytics, "IPLab User's Guide", 1991, 268 pages.
"Silma Products—Production Pilot", retrieved from Internet on May 24, 2001, <www.adept.com/Silma/products/pd-productionpilot.html>, 4 pages.
Sim, et al., "Design and Implementation of the Visual Programming Environment for the Distributed Image Processing", IEEE, 1996, pp. 149-152.
Simulink, "Simulink Release Notes", Jun. 2, 2004, 78 pages.

* cited by examiner

CONFIGURING BUFFERS WITH TIMING INFORMATION

FIELD OF THE INVENTION

The present invention relates to the field of data transfer, and more particularly to a system and method configuring buffers with timing information

DESCRIPTION OF THE RELATED ART

System designers and programmers often desire to configure devices to transfer data between themselves. For example, in the field of test and measurement, a measuring device may acquire data from various sensors or other devices and then perform a measurement function. Oftentimes, the acquired data must be transferred to another device, e.g., a host device or computer system, for processing.

Currently, programming languages force designers to deal with the data transfer and the timing of the data transfer as separate entities. For example, a buffer may be configured to store data of the transfer, but the timing may be programmed as part of the control loop cycle (e.g., an application program consuming the isochronous data) that is separate from the buffer. Accordingly, improvements in specifying data transfers are desired.

SUMMARY OF THE INVENTION

Various embodiments of a system and method for configuring buffers with timing information are presented below.

A buffer may be configured for transferring data between a first device and a second device. The first device and the second device may operate, at least in part, according to a common or synchronized clock. Configuring the buffer may include specifying a size of the buffer, specifying timing for delivery of data of the buffer (e.g., according to the common clock), specifying a time offset for the delivery of the data, and/or a period for delivery of the data (e.g., where the transfer is to occur periodically). The configuration of the buffer may be performed manually, in response to user input (e.g., specifying the size, timing, time offset, period, etc.) specifying the buffer, or may be performed in an automatic fashion, as desired. In some embodiment, a combination of manual and automatic configuration may be used.

In one embodiment, the buffer may be configured in a graphical program. More specifically, the graphical program may include a plurality of nodes interconnected by wires. The graphical program may also include a buffer node corresponding to the buffer. Accordingly, in one embodiment, configuring the buffer may include graphically configuring the buffer, e.g., by connecting various nodes of the graphical program to the buffer node.

In response to the configuration of the buffer, code may be automatically generated. The automatically generated code may be executable to transfer the data from the first device to the second device according to the specified timing for delivery of the data of the buffer. Alternatively, the automatically generated code may be used to configure a programmable hardware element to implement the transfer of data from the first device to the second device according to the specified timing for delivery of the data of the buffer. In one embodiment, the automatically generated code may include code implementing a transfer engine to perform the specified timing.

In some embodiments, the data transfer may be performed a plurality of times. Additionally, the buffer may not be a FIFO or type of buffer where each portion of the data is always saved until read. For example, data in the buffer may be overwritten prior to being read, e.g., by the second device. Thus, data of a first transfer may overwrite data of a previous transfer prior to the second device reading the data of the previous transfer.

BRIEF DESCRIPTION OF THE DRAWINGS

A better understanding of the present invention can be obtained when the following detailed description of the preferred embodiment is considered in conjunction with the following drawings, in which.

Figure 1A:
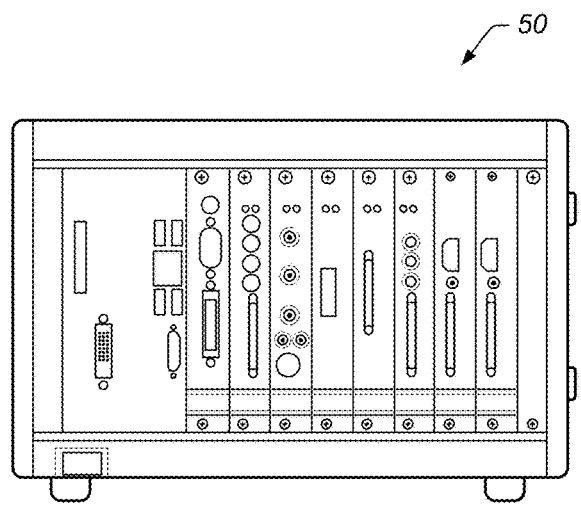
FIGS. 1A-1C illustrate exemplary systems, according to various embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568, titled "Graphical System for Modeling a Process and Associated Method", issued on Apr. 3, 1990.

U.S. Pat. No. 6,219,628, titled "System and Method for Configuring an Instrument to Perform Measurement Functions Utilizing Conversion of Graphical Programs into Hardware Implementations", filed Aug. 18, 1997.

U.S. Pat. No. 7,210,117, titled "System and Method for Programmatically Generating a Graphical Program in Response to Program Information", filed Dec. 20, 2000.

U.S. patent application Ser. No. 12/846,970, titled "Specification of Isochronous Data Transfer in a Graphical Programming Language", filed on Jul. 30, 2010.

U.S. Pat. No. 7,996,782, titled "Data Transfer Indicator Icon in a Diagram", filed on Jun. 8, 2007.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1B:
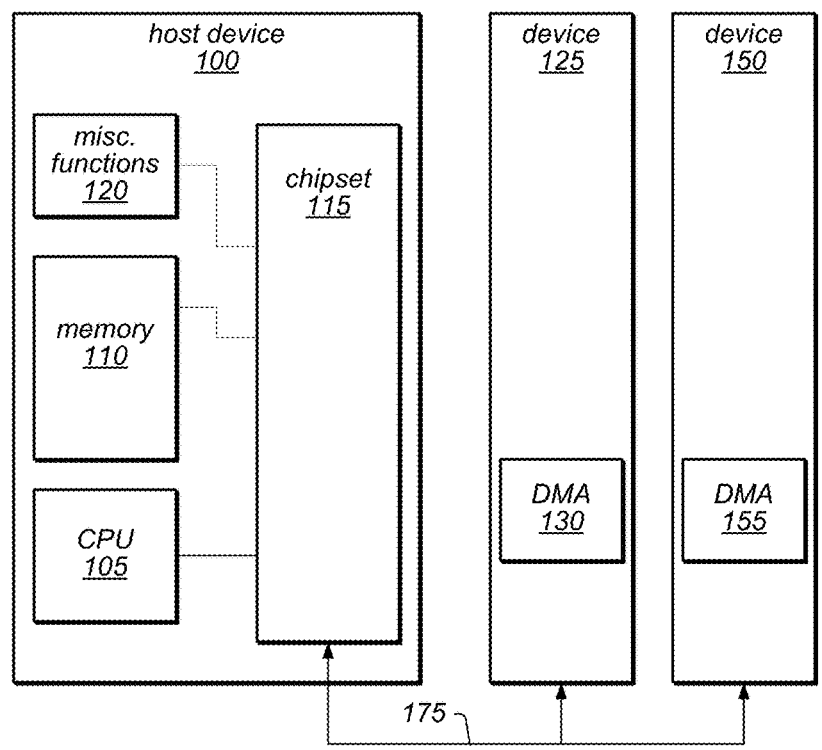
Figure 1C:
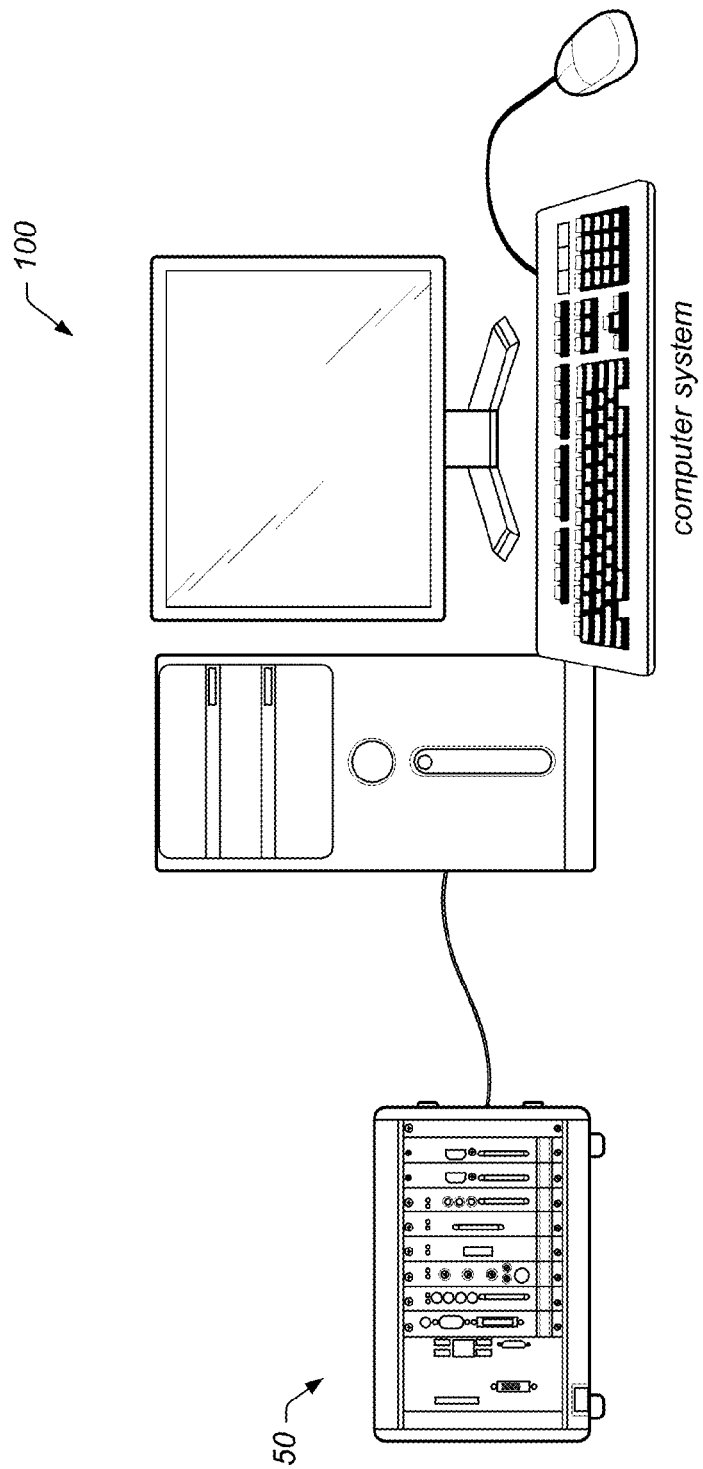

FIGS. 1A-1C—Exemplary Systems

FIGS. 1A-1C illustrate exemplary systems which may implement embodiments described herein. FIGS. 1A and 1B illustrate embodiments of a chassis 50. As shown, the chassis 50 may include a host device 100 (e.g., a host controller board), which may include a CPU 105, memory 110, and chipset 115. Other functions that may be found on the host device 100 are represented by the miscellaneous functions block 120. In some embodiments, the host device 100 may include a processor and memory (as shown) and/or may include a programmable hardware element (e.g., a field programmable gate array (FPGA)). Additionally, one or more of the cards or devices (e.g., device 125 and/or 150) may also include a programmable hardware element. In further embodiments, a backplane of the chassis 50 may include a programmable hardware element. In embodiments including a programmable hardware element, it may be configured according to a graphical program as described in the various patents incorporated by reference above.

As shown, the host device 100 (e.g., the chipset 115 of the host device 100) may provide communication (e.g., PCIe communication, PXI communication, or other bus communication) to a first peripheral device 125 and a second peripheral device 150 over bus 175. The first peripheral device 125 and second peripheral device 150 may be configured to change configurations based on information provided by the host device 100, as described herein.

The devices may be any of various devices (e.g., PCIe devices), such as measurement devices (e.g., DAQ devices), processing devices, I/O devices, network devices, etc. Additionally, similar to above, the devices may include one or more programmable hardware elements or processors and memory to implement their respective functionality. In some embodiments, the devices 125 and 150 may include a DMA controller (130 and 155 respectively) to perform DMA transfers, e.g., to perform the transfers of data described herein.

As indicated above, embodiments of chassis 50 may be used in test and measurement systems, such as systems used to acquire, process or output data relating to a device or process being monitored or controlled, for instance. Accordingly, such a system may acquire data, and subsequently transfer the data for processing, storage, output, or the like. For example, in the case of chassis 50 being used to control a process (e.g., a closed loop system), data may be acquired, transferred to a processor where it may be processed, and subsequently transferred to an output such that the processed output may be employed to appropriately control the respective process.

Generally, the cards in the chassis 50 (such as devices 125 and 150) may be configured to interact with other external devices. For example, the devices may be coupled to various sensors, devices under test, etc. and may be used to perform a measurement function.

FIG. 1C illustrates host device 100 as a computer system. As shown in FIG. 2A, the host device 100 may be coupled to chassis 50 (e.g., including the first device 125 and the second device 150) and may include a display device and one or more input devices. Similar to descriptions of the host device 100 above, the host may include at least one memory medium on which one or more computer programs or software components according to one embodiment of the present invention may be stored. For example, the memory medium may store one or more graphical programs which are executable to perform the methods described herein. Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium. In alternate embodiments, the chassis 50 may include a host device and the computer system may be configured to communicate with the host device in the chassis 50. For example, the computer system may be used to configure the host device in the chassis 50 and/or the devices 125 and 150 also included in the chassis 50.

In various embodiments, the host device 100 may be coupled to a second computer system or device via a network (or a computer bus). The computer systems may each be any of various types, as desired. The network can also be any of various types, including a LAN (local area network), WAN (wide area network), the Internet, or an Intranet, among others. Similarly, the host device 100 may be coupled to the chassis 50 via various mechanisms.

Figure 2:
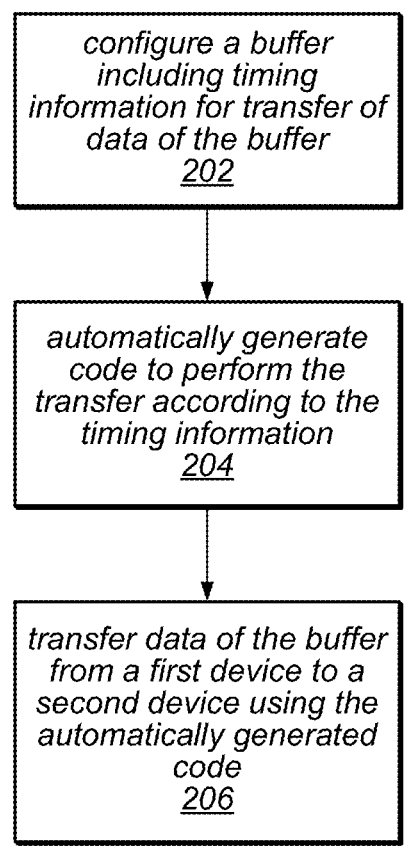
FIG. 2 is a flowchart diagram illustrating one embodiment of a method for configuring buffers with timing information.

FIG. 2—Configuring a Buffer with Timing Information

FIG. 2 illustrates a method for configuring a buffer with timing information. The method shown in FIG. 2 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 202, a buffer may be configured for transferring data between a first device and a second device. The first device and the second device may operate, at least in part, according to a common or synchronized clock, e.g., which is communicated between the two devices. Configuring the buffer may include specifying a size of the buffer, specifying timing for delivery of data of the buffer (e.g., according to the common clock), specifying a time offset for the delivery of the data, and/or a period for delivery of the data (e.g., where the transfer is to occur periodically), among other possibilities. The configuration of the buffer may be performed manually, in response to user input (e.g., specifying the size, timing, time offset, period, etc.), or may be performed in an automatic fashion, as desired. In some embodiment, a combination of manual and automatic configuration may be used. For example, the size of the buffer may be automatically determined based on the type or source of the data being stored in the buffer while the period and offset may be specified by a user.

In one embodiment, the buffer may be configured in a graphical program. More specifically, the graphical program may include a plurality of nodes interconnected by wires. The graphical program may be created on the computer system, such as the computer system shown in FIG. 1C. The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. The graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

The graphical program may also include a buffer node corresponding to the buffer. Accordingly, in one embodiment, configuring the buffer may include graphically configuring the buffer, e.g., by connecting various nodes of the graphical program to the buffer node. For example, a first node may be connected to a first input of the buffer node for specifying a data source or providing the data to be stored in the buffer; a second node may be connected to a second input of the buffer node specify a period for the data transfer; a third node may be connected to a third input of the buffer for specifying a timing offset; etc. Additionally, or alternatively, the buffer may be configured in other ways, e.g., using a graphical user interface, such as a wizard, to specify various parameters of the buffer.

In response to the configuration of the buffer, in 204, code may be automatically generated. The automatically generated code may be executable to transfer the data from the first device to the second device according to the specified timing for delivery of the data of the buffer. Alternatively, the automatically generated code may be used to configure a programmable hardware element to implement the transfer of data from the first device to the second device according to the specified timing for delivery of the data of the buffer. In one embodiment, the automatically generated code may include code implementing a transfer engine to perform the specified timing.

Additionally, the buffer itself may be created in response to the user input configuring the buffer. Alternatively, the automatically generated code may be used or implemented to create the buffer, according to the configuration. For example, memory may be created or allocated in a programmable hardware element, memory, register, etc. in order to implement the buffer. The specific hardware used for the buffer may be automatically determined based on the timing requirements and size specified in 202. For example, the buffer may be created only where the timing requirements and size may be met.

In some embodiments, the data transfer may be performed a plurality of times. Additionally, the buffer may not be a FIFO or type of buffer where each portion of the data is always saved until read. For example, data in the buffer may be overwritten prior to being read, e.g., by the second device. Thus, data of a first transfer may overwrite data of a previous transfer prior to the second device reading the data of the previous transfer.

Accordingly, in 206, the data may be transferred according to the specified configuration (e.g., by executing the automatically generated code).

In addition to configuring the buffer, a data write to the buffer (e.g., by the first device) and a data read of the transferred data (e.g., by the second device) may also be specified. Based on the configuration of the buffer, the generation of the code may ensure that the write of the data is performed with enough time to perform the data transfer, and that the data read of the transferred data is performed after the data transfer is completed.

FIGS. 3-7—Exemplary Embodiment

FIGS. 3-7 illustrate one particular example corresponding to an embodiment of the method of FIG. 2.

As discussed above, the following may be specified for the buffer (e.g., which may be referred to as a "time sensitive buffer"): 1) Data Size—the amount of data to be transferred; 2) Direction of data (in or out); 3) Period—the periodic interval at which the data may be transferred; and 4) Time Offset—the offset within the period when the transfer is triggered. This offset may allow producers and consumers of the data to be phase offset from each other to ensure minimum age of data.

Using this information the compiler may determine the required bandwidth and schedule of transfer between two targets exchanging data (e.g., isochronous data). Additionally, this kind of specification allows for an intuitive method for specifying multi-rate transfers. For example, multiple buffers can be configured each having it own period and offset. As discussed above, the two systems or devices involved in the transfer may have a common or global time base. This common time base or clock may allow the producer target and the consumer target to synchronize their application loops based on period and time offset specified on the buffer. Global time synchronization can be achieved by many means using signal based or time based clock synchronization.

An example of using such two buffers is shown below. In this particular example, a computer system is coupled to a chassis, similar to embodiments described above. The chassis includes a PCIe-7842R which includes an FPGA. The chassis also includes a real time host device which is capable of executing a graphical program (e.g., using a real time OS). Accordingly, this example is shown in the context of using a graphical programming language, such as LabVIEW®, provided by National Instruments. However, embodiments described herein are not limited to a particular graphical programming environment or even graphical programming in general. For example, such buffers may be configured in textual programming systems.

Figure 3:
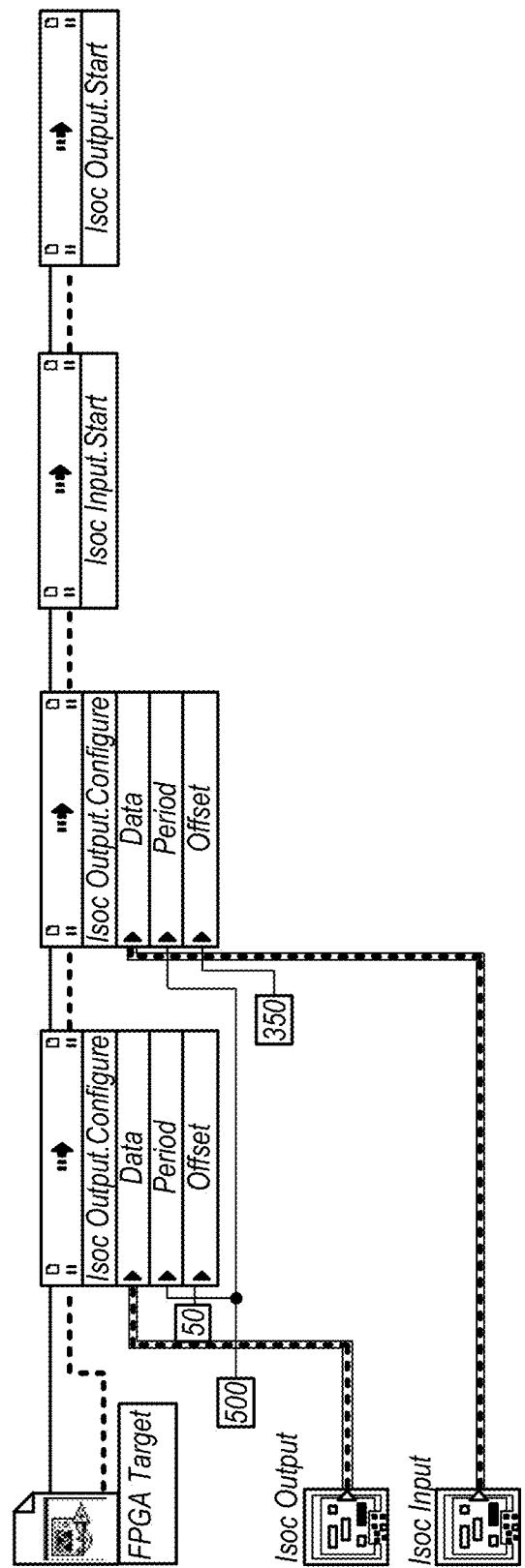
FIG. 3 is an exemplary portion of a graphical program for configuring buffers, according to one embodiment.
Figure 4:
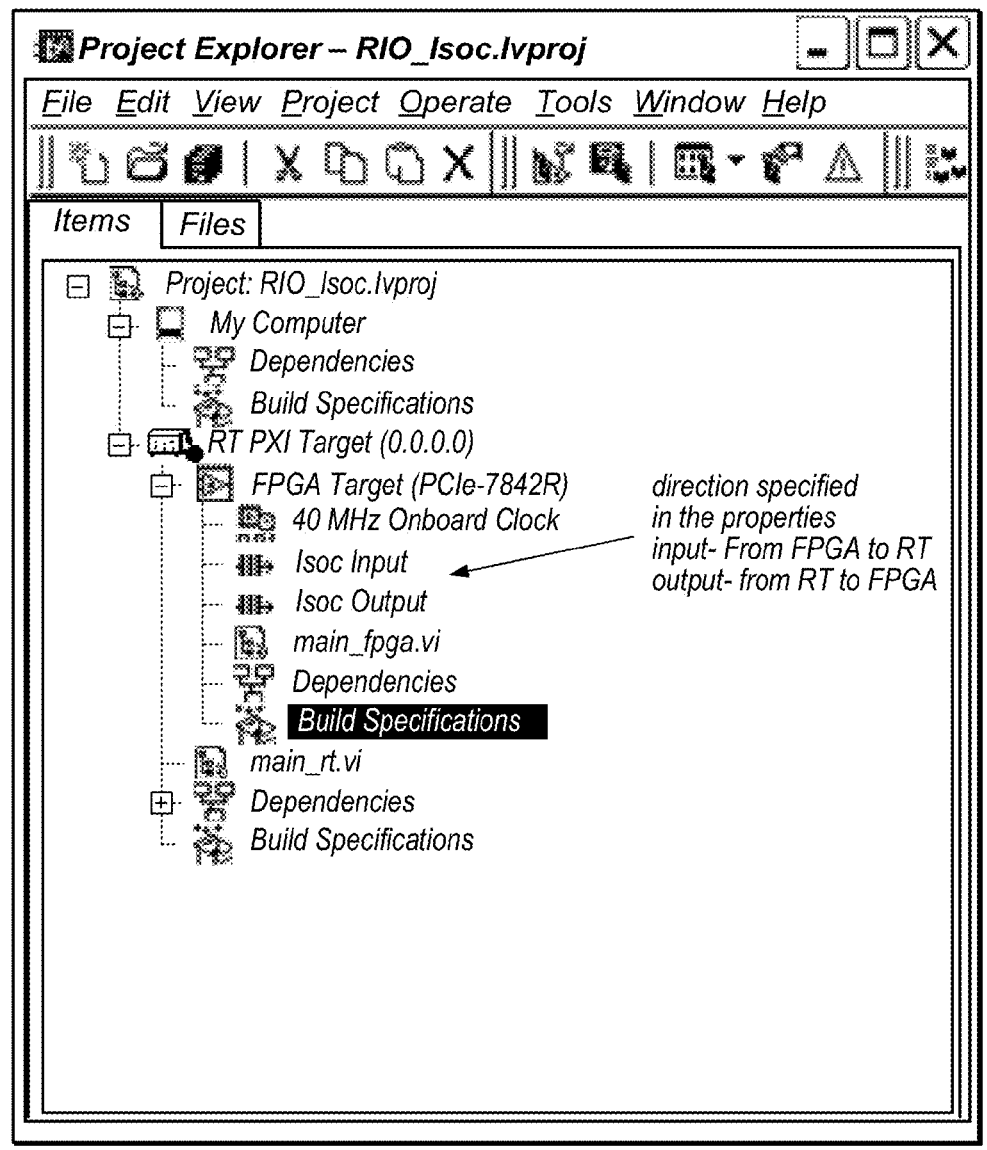
FIG. 4 is an exemplary project explorer for specifying buffers, according to one embodiment.

FIG. 3 illustrates an exemplary portion of a graphical program where two time sensitive buffers are created: 1) Isoc Output transfers data from an RT target to an FPGA target; and 2) Isoc Input transfers data from an FPGA target to an RT target. In the example of FIG. 3, the two time sensitive buffers are configured with pre-defined fixed size of a heterogeneous set of data (specified from the nodes "Isoc Output" and "Isoc Input" to the respective "data" terminals of the buffers). From this specification, the compiler can calculate the amount of data required to be sent. As also shown, the period is specified for both buffers by coupling the node representing the value "500" to the period terminals of each buffer. The period specifies the time interval for performing the data transfer. Using the size and period, the compiler can calculate the utilized or necessary bus bandwidth for performing the transfer. Finally, the time offset is specified by coupling the "50" and "350" nodes to the corresponding terminals of the two buffers. The time offset may specify the precise "relative time" within the period when the data transfer is triggered. As mentioned before, this time period may allow for coordination of reading and writing the data to ensure minimum age as well as flexible scheduling options.

The direction of the data transfer may be explicitly specified when the buffers are created as a memory resource in the project. For example, in the exemplary project explorer diagram shown in FIG. 4, the buffers are created as a memory resource by adding the "Isoc Input" and "Isoc Output" resources within the FPGA target portion of the RT target. Accordingly, the specification (within the FPGA target portion of the project explorer) as an "input" means that the transfer is from the FPGA target to the RT target and output means that the transfer from the RT target to the FPGA target.

Figure 5A:
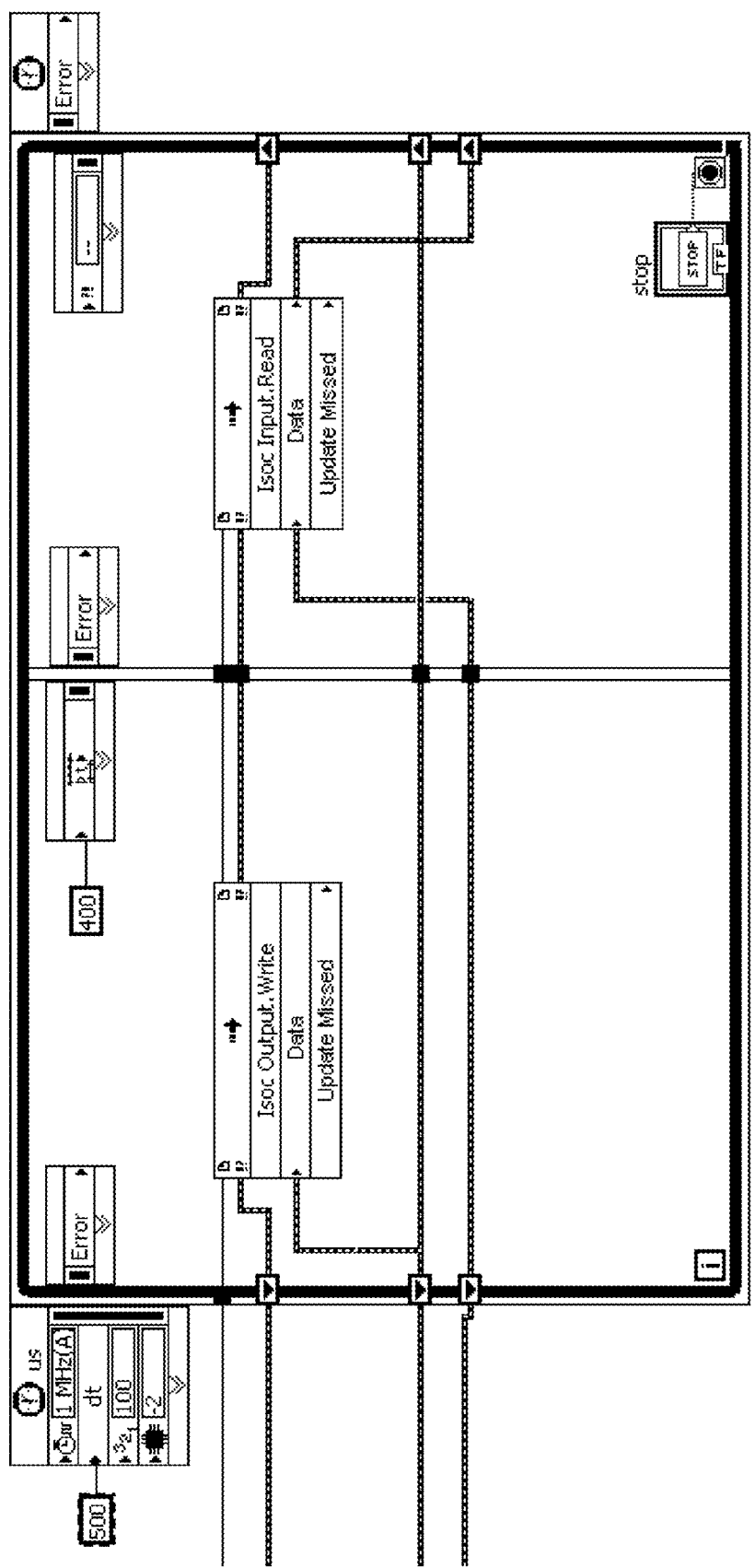
FIGS. 5A and 5B are exemplary graphical programs using the configured buffers of FIGS. 3 and 4.
Figure 5B:
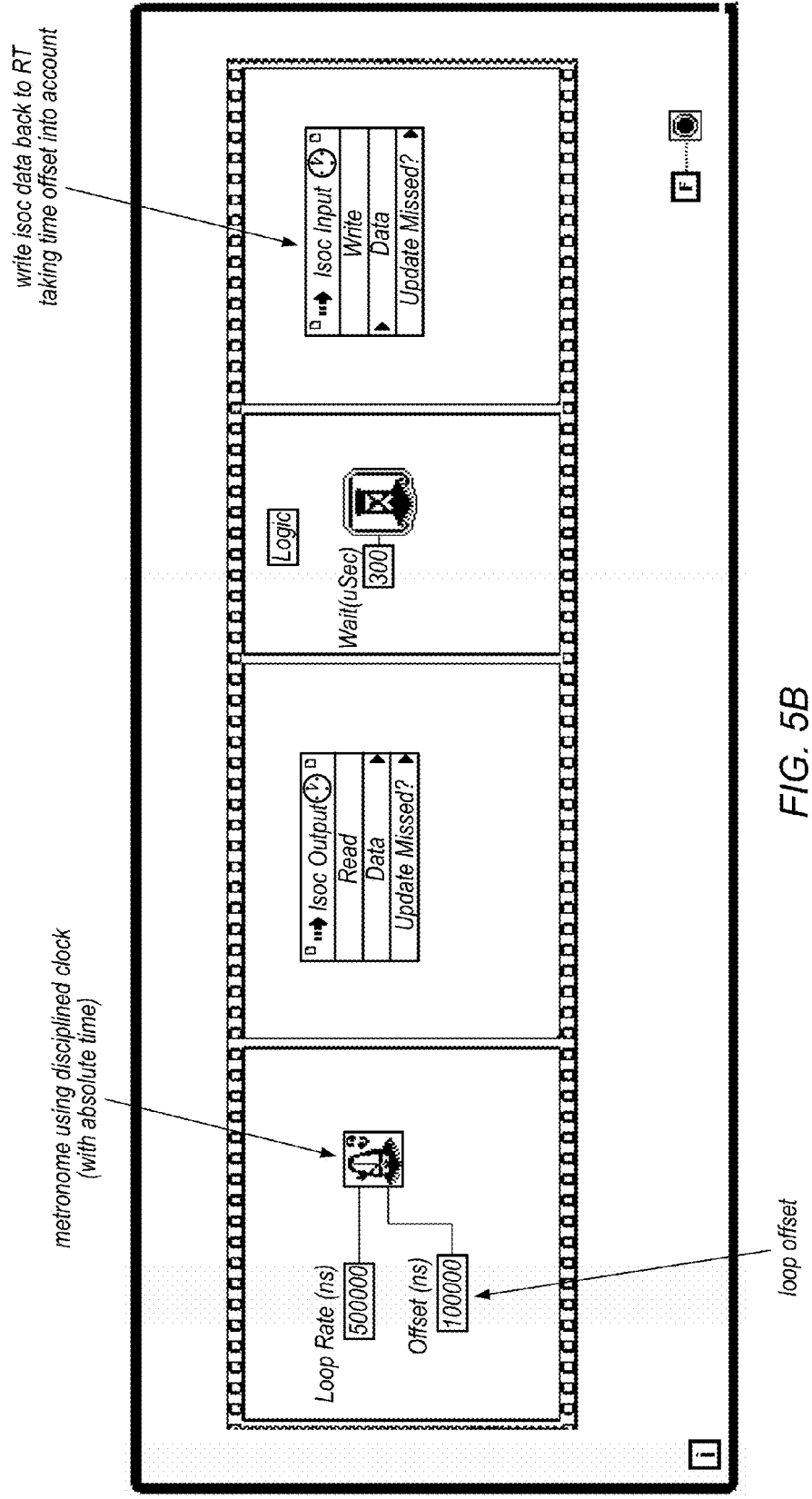

FIGS. 5A and 5B illustrate exemplary graphical programs that may be implemented/executed on the real time target and FPGA. In this specific example, FIG. 3 is a first portion of a graphical program and FIG. 5A is a second portion of a graphical program that is implemented on the real time target. More specifically, in FIG. 3, various parameters of the transfer to and from the buffers are specified and in FIG. 5A they are used for data reads and writes. Additionally, FIG. 5B is an exemplary graphical program that may be implemented on the FPGA and uses the configured buffers for its portion of the data reads and writes. In more detail, in FIG. 5A, the outputs of FIG. 3 are provided to a timed loop, having a period of 500 microseconds, an offset of 0 microseconds (which implies that output data is immediately written to the buffer as soon as the loop wakes up), and an additional offset of 400 microseconds before reading the data from the buffer. Similarly, FIG. 5B illustrates an exemplary graphical program (with a sequence structure inside a loop that runs every 500 microseconds) that may be implemented by the FPGA target to perform its portion of the read and write. As shown, this loop wakes up with an offset of 100 microseconds (to ensure that it is reading data from the output buffer only after it has been transferred). In this figure, the offsets are set such that data is read from the output buffer only after the transfer has taken place. Similarly, input data is written to the buffer before it is transferred, hence the delay of 300 microseconds.

Figure 6:
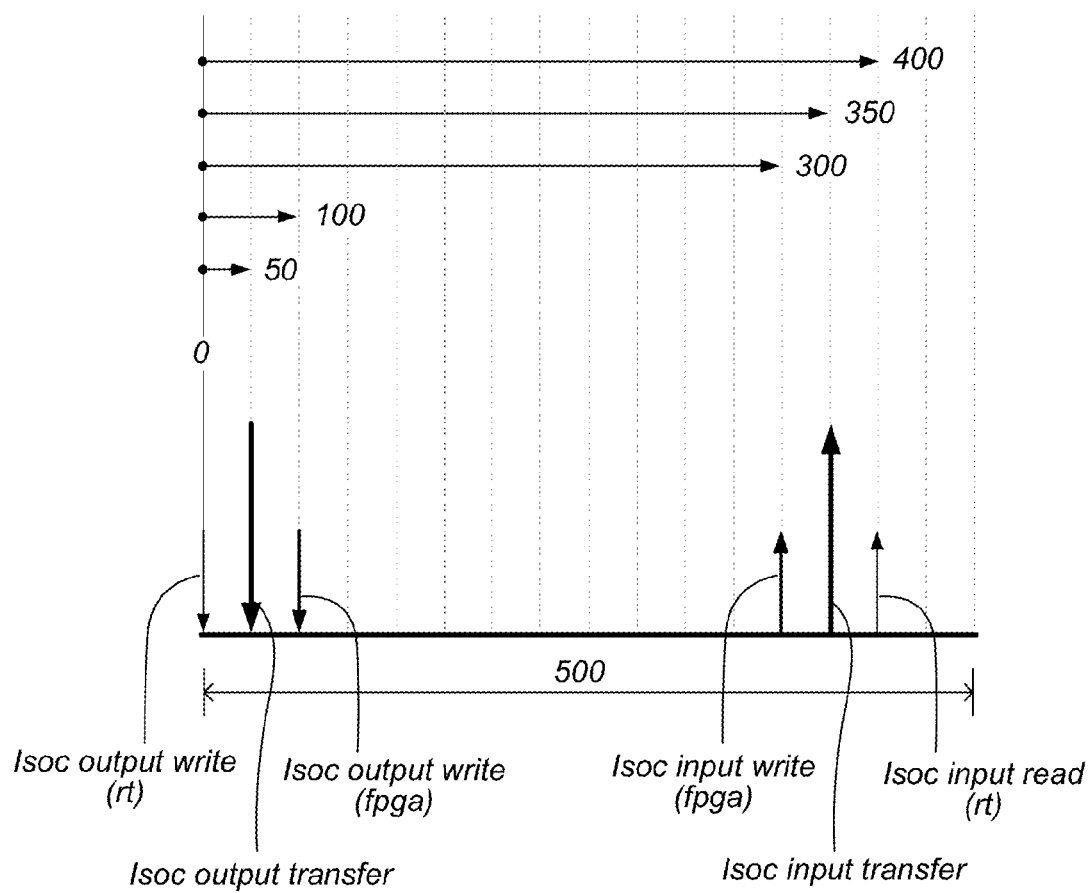
FIG. 6 is an exemplary timing diagram corresponding to the buffers of FIGS. 3 and 4.

Specification of buffers in this way enables the compiler to schedule the transfers as shown in the exemplary timing diagram of FIG. 6. The "Isoc Output Transfer" and "Isoc Input Transfer" lines indicate the transfer times within the period. Using heuristics the compiler can also suggest appropriate times for reading and writing to the buffers, such as the "Isoc Output Write" performed by the real time target, the "Isoc Output Read" performed by the FPGA target, the "Isoc Input Write" performed by the FPGA target, and the "Isoc Input Read" performed by the real time target.

If the hardware interconnect/bus that connects the targets supports isochronous natively, then this buffer specification can be used to configure the isochronous streams on the bus. If not, additional logic can be generated to initiate transfer using the global time as mentioned before.

Figure 7:
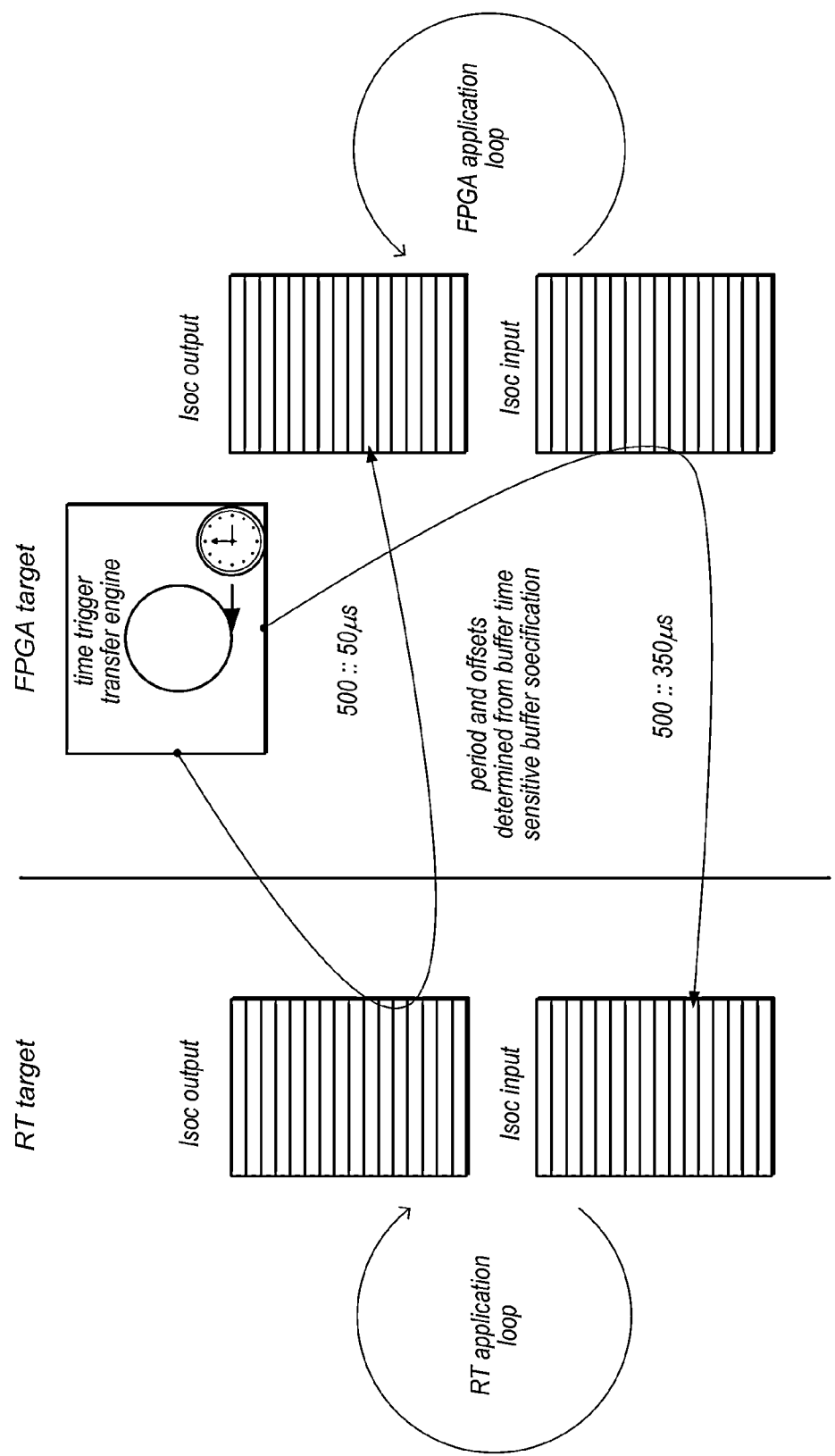
FIG. 7 is a diagram illustrating the transfer of data specified in the configured buffers of FIGS. 3-5B.

For the current example the mapping scheme is described below. More specifically, the reading and writing of the data can be aligned with the reading and writing shown in the timing diagram of FIG. 6. In this example, since the interconnect bus is PCIExpress, the data transfer can be triggered by a time triggered logic block generated by the compiler on the FPGA target. As shown in FIG. 7, since there is a global notion of time, the time triggered logic can use device initiated DMA to read the "Isoc Output" from the RT target memory and write the "Isoc Input" to the RT target memory periodically at the offset specified by the time sensitive buffer specifications. Thus, following the method of FIG. 2, the automatically generated code may be executed or implemented to perform the data transfer in the manner shown in FIG. 7 (and according to the specification of FIGS. 2-6). If more buffers were created each buffer would be transferred based on its period and offset in the same way.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method, comprising:
  configuring a buffer, wherein said configuring the buffer comprises:
    specifying a size of the buffer;
    specifying timing for delivery of data of the buffer; and
    specifying transfer of the data from a first device to a second device, wherein the buffer is comprised within one of the first device or the second device;
  automatically generating code based on said configuring the buffer, wherein said automatically generated code implements the transfer of the data from the first device to the second device according to the specified timing for delivery of the data of the buffer;
  wherein the automatically generated code is executable to transfer the data according to the specified timing from the first device to the second device.

2. The method of claim 1, wherein said specifying the timing for delivery of the data of the buffer comprises specifying a time offset for the delivery of the data of the buffer.

3. The method of claim 1, wherein said specifying the timing for delivery comprises specifying a period for performing the transfer of data a plurality of times.

4. The method of claim 1, wherein said configuring the buffer comprises graphically configuring the buffer.

5. The method of claim 1, wherein the buffer is specified in a graphical program, wherein the graphical program comprises a plurality of nodes connected by wires, wherein a first node of the graphical program corresponds to the buffer.

6. The method of claim 1, wherein said automatically generating code comprises automatically configuring a transfer engine to perform the specified transfer of data according to the specified timing.

7. The method of claim 1, further comprising:
  specifying a data read of the data by the second device;
  wherein said automatically generating code comprises generating code to perform said transferring the data prior to the data read.

8. The method of claim 1, wherein said configuring the buffer is performed in response to user input.

9. The method of claim 1, wherein the first device and the second device operate at least in part according to a common clock, wherein the timing for delivery of data is specified according to the common clock.

10. The method of claim 1, wherein said transferring the data is performed a plurality of times, wherein data of a first transfer overwrites data of a previous transfer prior to the second device reading the data of the previous transfer.

11. A non-transitory, computer accessible memory medium storing program instructions, wherein the program instructions are executable to:
  configure a buffer in a graphical program, wherein the graphical program comprises a plurality of nodes interconnected by wires, wherein the graphical program comprises a buffer node corresponding to the buffer, and wherein said configuring the buffer comprises:
    specifying a size of the buffer;
    specifying timing for delivery of data of the buffer; and
    specifying transfer of the data from a first device to a second device, wherein the buffer is comprised within one of the first device or the second device; and
  automatically generate code based on said configuring the buffer, wherein the automatically generated code implements the transfer of the data from the first device to the second device according to the specified timing for delivery of the data of the buffer;
  wherein the automatically generated code is executable to transfer the data according to the specified timing from the first device to the second device.

12. The non-transitory, computer accessible memory medium of claim 11, wherein said configuring the buffer comprises graphically configuring the buffer by connecting one or more nodes of the graphical program to the buffer node.

13. The non-transitory, computer accessible memory medium of claim 11, wherein said configuring the buffer comprises receiving user input connecting one or more nodes of the graphical program to the buffer node.

14. The non-transitory, computer accessible memory medium of claim 11, wherein said specifying the timing for delivery of the data of the buffer comprises specifying a time offset for the delivery of the data of the buffer.

15. The non-transitory, computer accessible memory medium of claim 11, wherein said specifying the timing for delivery comprises specifying a period for performing the transfer of data a plurality of times.

16. The non-transitory, computer accessible memory medium of claim 11, wherein said automatically generating code comprises automatically configuring a transfer engine to perform the specified transfer of data according to the specified timing.

17. The non-transitory, computer accessible memory medium of claim 11, wherein the graphical program graphically specifies a data read of the data by the second device, wherein said automatically generating code comprises generating code to perform said transferring the data prior to the data read.

18. The non-transitory, computer accessible memory medium of claim 11, wherein the first device and the second device operate at least in part according to a common clock, wherein the timing for delivery of data is specified according to the common clock.

19. The non-transitory, computer accessible memory medium of claim 11, wherein said transferring the data is performed a plurality of times, wherein data of a first transfer overwrites data of a previous transfer prior to the second device reading the data of the previous transfer.

20. A system, comprising:
a processor; and
a memory, coupled to the processor, wherein the memory stores program instructions executable by the processor to:
configure a buffer in a graphical program, wherein the graphical program comprises a plurality of nodes interconnected by wires, wherein the graphical program comprises a buffer node corresponding to the buffer, and wherein said configuring the buffer comprises:
specifying a size of the buffer;
specifying timing for delivery of data of the buffer; and
specifying transfer of the data from a first device to a second device, wherein the buffer is comprised within one of the first device or the second device; and
automatically generate code based on said configuring the buffer, wherein the automatically generated code implements the transfer of the data from the first device to the second device according to the specified timing for delivery of the data of the buffer;
wherein the automatically generated code is executable to transfer the data according to the specified timing from the first device to the second device.

* * * * *

UNITED STATES PATENT AND TRADEMARK OFFICE
CERTIFICATE OF CORRECTION

PATENT NO. : 8,612,637 B2  
APPLICATION NO. : 13/244572  
DATED : December 17, 2013  
INVENTOR(S) : Chandoke Page 1 of 1

It is certified that error appears in the above-identified patent and that said Letters Patent is hereby corrected as shown below:

Title Page:

(73) Assignee:  
delete "National Instruments Corportion" and  
substitute -- National Instruments Corporation --.

Signed and Sealed this  
Eleventh Day of March, 2014

Michelle K. Lee  
*Deputy Director of the United States Patent and Trademark Office*